United States Patent [19]

Thyselius

[11] 4,068,098
[45] Jan. 10, 1978

[54] METHOD OF AND ARRANGEMENT FOR ADDRESSING A SWITCH MEMORY IN A TRANSIT EXCHANGE FOR SYNCHRONOUS DATA SIGNALS

[75] Inventor: Per-Olof Thyselius, Tyreso, Sweden

[73] Assignee: Telefonaktiebolaget L M Ericsson, Stockholm, Sweden

[21] Appl. No.: 654,021

[22] Filed: Jan. 30, 1976

[30] Foreign Application Priority Data

Feb. 14, 1975 Sweden .................................. 7501678

[51] Int. Cl.² ........................... H04J 3/16; H04J 11/04
[52] U.S. Cl. ............................. 179/15 BV; 179/15 AT
[58] Field of Search ........ 179/15 BV, 15 BA, 15 AT, 179/15 AQ

[56] References Cited

U.S. PATENT DOCUMENTS

| | | | |
|---|---|---|---|
| 3,458,659 | 7/1969 | Sterning | 179/15 AQ |
| 3,678,205 | 7/1972 | Cohen | 179/15 AQ |
| 3,740,483 | 6/1973 | Pedersen | 179/15 AQ |
| 3,856,993 | 12/1974 | Closs | 179/15 BV |
| 3,859,467 | 1/1975 | Borgstrom | 179/15 BY |
| 3,922,494 | 11/1975 | Cooper | 179/15 BV |
| 3,934,093 | 1/1976 | Thyselius | 179/15 BA |

*Primary Examiner*—David L. Stewart

*Attorney, Agent, or Firm*—Hane, Roberts, Spiecens & Cohen

[57] ABSTRACT

A method of and an apparatus is disclosed for economically addressing memory positions in a switch memory of a transit exchange for the transfer of synchronous data signals between incoming and outgoing TDM links comprising data channels of several data rates, each constituting a multiple of a basic rate derived from the number of time slots in a TDM frame. The data signals are stored in a switch memory having a memory position for each of the data channels in the incoming links and are then transferred to a buffer memory having a memory position for each time slot of the data channels in the outgoing links before they are sent out on these links. The memory writing as well as the reading occurring at a repetition rate determined by the data rate of the respective data channel. The data signals are written into the switch memory by the aid of an address calculator including a structure memory for the storage of information indicating the allocation of time slots to the various data channels of each link, which information is common to all links of the same type, and a type memory for the storage of type designations where the relevant type designation is addressed by means of the identity number of the link.

2 Claims, 6 Drawing Figures

ADDRESS CALCULATING UNIT

ADDRESS CALCULATING UNIT

SWITCH MEMORY KM

| DATA | CLASS | ADDR. | | |
|---|---|---|---|---|
| | | | K 1  1200ch/s | |
| | | | K 2  " | |
| | | | K 3  " | MF 101 |
| | | | K 4  " | |
| | | | K 5  " | |
| | | | K 1  300ch/s | |
| | | | K 2  " | |
| | | | K 3  " | |
| | | | K 4  " | |
| | | | K 5  " | |
| | | | K 6  " | MF 102 |
| | | | K 7  " | |
| | | | K 8  " | |
| | | | K 9  1200ch/s | |
| | | | K10  " | |
| | | | K11  " | |
| | | | K 1  75ch/s | |
| | | | K 2  " | |
| | | | K 1  6000ch/s | MF 415 |
| | | | K 1  300ch/s | |
| | | | K 2  " | |
| | | | K 3  " | |
| | | | K 4  " | |
| | | | K 5  600ch/s | MF 416 |
| | | | K 6  " | |
| | | | K 7  " | |
| | | | K 8  " | |
| | | | K 9  1200ch/s | |
| | | | K10  " | |

*Fig. 4*

STRUCTURE MEMORY SM

| TIME SLOT | TYPE I | TYPE II |
|---|---|---|
| 1 | CHANNEL 1 | CHANNEL 1 |
| 2 | 2 | 5 |
| 3 | 3 | 7 |
| 4 | 4 | 9 |
| 5 | 5 | 10 |
| 6 | 1 | 2 |
| 7 | 2 | 6 |
| 8 | 3 | 8 |
| 9 | 4 | 9 |
| 10 | 5 | 10 |
| 11 | 1 | 3 |
| 12 | 2 | 5 |
| 13 | 3 | 7 |
| 14 | 4 | 9 |
| 15 | 5 | 10 |
| 16 | 1 | 4 |
| 17 | 2 | 6 |
| 18 | 3 | 8 |
| 19 | 4 | 9 |
| 20 | 5 | 10 |
| 21 | 1 | 1 |
| 22 | 2 | 5 |
| 23 | 3 | 7 |
| 24 | 4 | 9 |
| 25 | 5 | 10 |
| 26 | 1 | 2 |
| 27 | 2 | 6 |
| 28 | 3 | 8 |
| 29 | 4 | 9 |
| 30 | 5 | 10 |
| 31 | 1 | 3 |
| 32 | 2 | 5 |
| ... | ... | ... |
| 73 | 3 | 7 |
| 74 | 4 | 9 |
| 75 | 5 | 10 |
| 76 | 1 | 4 |
| 77 | 2 | 6 |
| 78 | 3 | 8 |
| 79 | 4 | 9 |
| 80 | 5 | 10 |

Fig. 6

METHOD OF AND ARRANGEMENT FOR ADDRESSING A SWITCH MEMORY IN A TRANSIT EXCHANGE FOR SYNCHRONOUS DATA SIGNALS

The present invention relates to a method of and an arrangement for economically addressing memory positions in a switch memory in a transit exchange for the transfer of synchronous data signals from incoming TDM links to outgoing TDM links. When the links transfer data channels of several data rates which constitute multiples of a basic rate derived from the number of time slots in a TDM frame, the transit exchange includes a switch memory for storage of incoming data signals in memory positions, each of which is assigned to one of the incoming data channels in the incoming links, and a buffer memory to which the data signals are transferred and are stored in memory positions assigned to the time slots belonging to the respective channel in the outgoing links before they are sent out via these links, the writing as well as the reading occurring at a repetition rate determined by the data rate of the respective channel.

The traffic in large public data networks is likely to have a high call intensity and short occupation times for a very great part of the traffic. In order to reduce the load on the common control functions, therefore, it is expedient to design the transit exchange in such a way that each data channel has its own signal sending and signal receiving units at its disposal which are directly connected to the channel. Thereby searching for free signalling units as well as connection and disconnection of the calling and the called channel to and from the signalling units can be avoided.

In the case when all the data channels have the same data rate, a switching network using signal units working according to the time division multiplex principle can be obtained in such a way that the incoming transmission direction from all the connected channels is multiplexed onto a common data bus. The switching network is then furnished with a switch memory, where each channel is represented by a word. The word which corresponds to a certain channel is read from the memory at the same time as the incoming data from the channel is put onto the common bus system. At that moment a common logic unit can treat the incoming data in dependence of information about the channel and previously received data signals which are stored in the channel word.

A connection network based on this principle is described, for example, in the Swedish patent application 7310969-6 and in IEEE, Transactions on Communications, Nov. 1974, in an article titled "A Time-Division Data Switch."

Switching networks for synchronous data intended for time division multiplexed trunk lines and comprising channels of several rates quite seldomly appear in available literature. The report pulished by The Central National Administration of the Swedish Board of Telecommunications "Separate Common Data Networks, System Research," however, comprises a basic proposal for such a switching network.

The above mentioned proposal describes a switching network which includes a control memory comprising a word for each time slot in every incoming multiplex and a buffer memory comprising a position for each time slot in every outgoing multiplex. The incoming multiplex connections are "frame adjusted" in an equipment tied to each connection, whereby time slots with the same order number in all multiplex frames are simultaneously available on the input to the switching network. Therefore the interrelation of the time slots in each multiplex to the words in the control memory can be simply identified. The words in the control memory comprise address information for addressing, on the one hand, the positions in the buffer memory and, on the other hand, special signal devices for line signalling and centralized signalling. Signal emitting devices are connected, in principle, in the same way as incoming channels, i.e. they are represented in the control memory by one word for each time slot being utilized.

The described principle thus presumes individual treatment of each time slot for channels with higher rates than the basic rate and hence utilize more than one time slot. Moreover, connection of special signal devices is assumed during the setting-up procedures and also buffering in connection with each multiplex connection for frame adjustment.

It is desirable to reduce the load on the common equipment by connecting to each incoming data channel a facility for signal treatment in the form of a word in a switch memory which also can execute the addressing function which was executed by the control memory according to the proposal of the Data Network Committee and to eliminate the need for a separate treatment of each time slot in the channels with higher data rates by limiting the number of words in the switch memory to the smallest possible, i.e. one word per data channel for each connected multiplex.

The condition for being able to arrange the switch memory in the desired manner is the possibility to address the assigned memory word in the switch memory with the aid of identity information concerning a multiplex connection and a time slot. The multiplex identity is obtained directly from the equipment which controls the scanning of the incoming connections. The time slot identity, on the other hand, must be derived from the present phase position of the multiplex frames on each connection. The phase position information can be transferred from each connection, either in parallel with the data signals on a separate bus line, or together with the data signals in the form of synchronizing information on the same bus line. An evident solution for achieving the required addressing is to establish a table listing all time slots for each of the multiplex connections which are connected to the transit exchange and giving the address to the assigned memory word in the switch memory. The drawback of this solution is, for large transit exchanges however, that this table requires a very huge memory. An exchange can comprise several hundred connections, each transferring some hundred time slots. The above mentioned memory would then have to comprise tens of thousands of positions which must be read with a very short access time. It is an object of the invention to considerably reduce this memory requirement. The characteristics of the invention appear from the claims.

In the following an embodiment of the invention will be described with reference to the accompanying drawing where:

FIG. 4 is a schematic diagram of the switch memory organization;

FIG. 6 is a schematic diagram of a memory included in the addressing apparatus.

Figure 1:
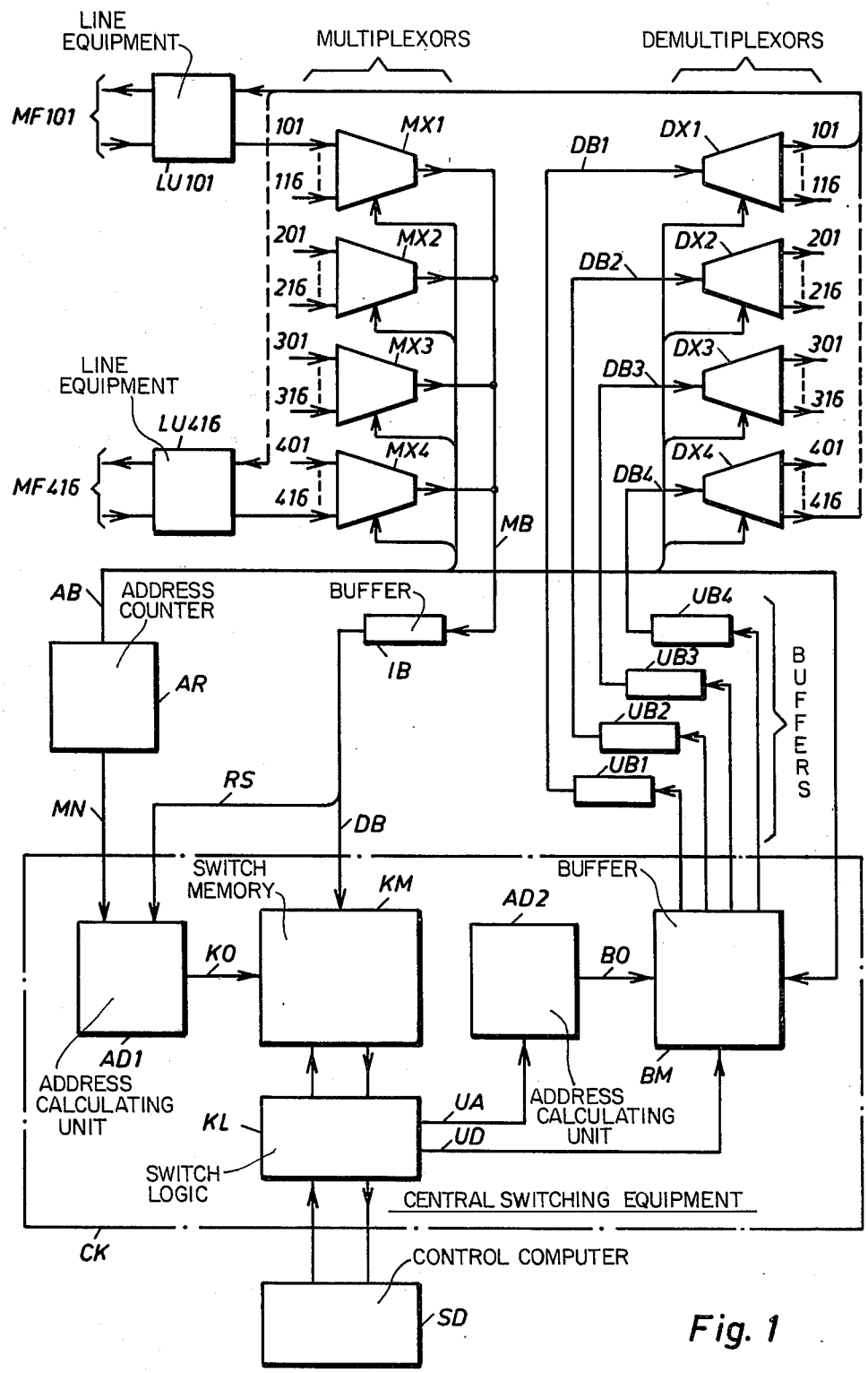
FIG. 1 is a block diagram of a transit exchange.
Figure 2:
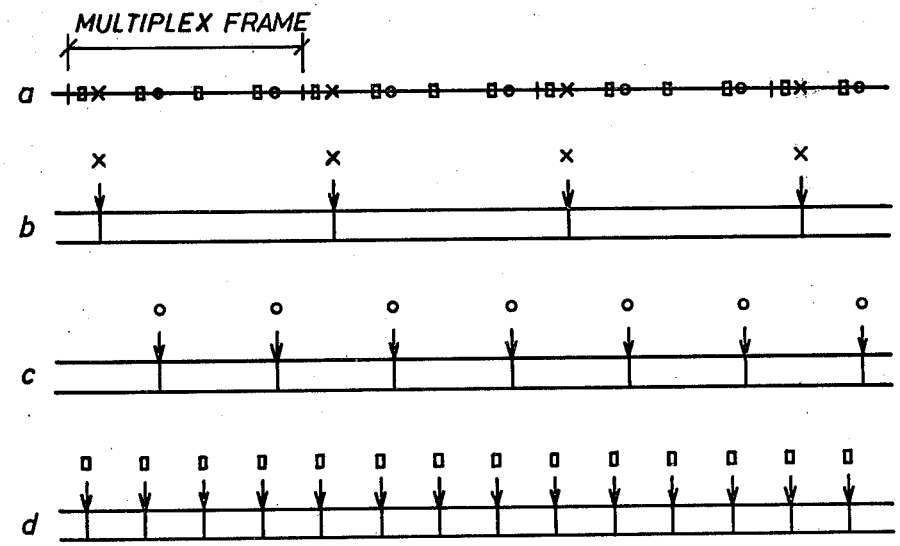
FIG. 2 is a timing diagram which illustrates the forming of data channels of several rates in a time multiplex frame.

FIG. 1 shows a transit exchange to which each one of 4 × 16 = 64 two-way connections ME 101 – MF 416 is connected via a line equipment LU 101 – LU 416. Each of the connections is arranged for the transfer in time division multiplex of a number of data channels with several rates, constituting multiples of a basic rate. This basic rate is determined in a known manner by the number of time slots in a time division multiplex frame. According to the embodiment the TDM frames are assumed to be character oriented and, besides the synchronization information, to comprise 80 time slots for data signals, each representing the basic rate of 75 characters per second. In FIG. 2 the positioning of three different data channels in a TDM connection is schematically shown. Line a shows a number of frames in which the time slots which are utilized have been marked with different symbols and on the lines b, c and d a series of data elements are illustrated, e.g. characters, corresponding to each of the channels with the data rates 1, 2 and 4 times the basic rate for the connection. The line equipments are arranged in 16-groups, for example equipments LU 101 – LU 116, each of which is connected to a multiplexor, e.g. multiplexor MX1, and to a demultiplexor, e.g. demultiplexor DX1, having the task to switch through the connections in selected time slots to an incoming common multiplexor bus line MB and to individual outgoing demultiplexor bus lines, e.g. DB1. The multiplexors MX1 – 4 together constitute a sampling arrangement for the signal values of the incoming data channels and the demultiplexors DX1 – 4 together constitute a reading arrangement for the transfer of indication values representing the signal values of the outgoing data channels to a regeneration arrangement included in each line equipment as will be described later. Each line equipment also includes circuits for the mutual synchronization of on the one hand the transit exchange and on the other hand the frame structures of the multiplex connections. All these circuits are assumed to be known per se.

The sampling and the reading functions operate synchronously and they are controlled by an address counter AR by means of address information which is transferred to all multiplexors and demultiplexors through the bus line AB according to a cyclic pattern where each time slot in every multiplex connection is addressed at a repetition rate of 75 times per second. At each addressing occasion, a series of sampling values carrying the information in a time slot are transferred to a read-in buffer IB, at the same time as the indication value referring to the corresponding time slot in the outgoing direction is transferred from a read-out buffer, e.g. UB1. The switching-through of the information from the read-in buffer to the read-out buffers takes place in a central switching equipment CK.

The equipment CK comprises a switch memory KM to which the incoming time slot information is brought via a data bus DB by means of address information KO from an address calculating unit AD1. The data signals stored in the switch memory are processed by the switch logic KL which is supported by the control computer SD. The signal processing concerns, for example, decoding and storing in the switch memory the outgoing address during the course of a setting-up procedure. From the switch memory the data signals are transferred via the switch logic KL to a buffer memory BM where they are stored in the memory words belonging to the outgoing time slots. In this connection the address stored in the switch memory is utilized, after convertion in an address calculating unit AD2.

The multiplex connections are addressed cyclically, whereby every cycle comprises 16 sequences of five steps each. During the first address step in each sequence, information relating to a time slot belonging to one multiplex connection in each of the four demultiplexors DX1 – DX4 is transferred from the buffer memory BM to the four read-out buffers UB1 – UB4. During the following four address steps the four read-out buffers are read out in turn to the respective time slots at the same time as the information from the corresponding incoming time slots are transferred in turn via the multiplexors MX1 – MX4 to the read-in buffer IB. At the same time as the information in a time slot is written into the corresponding memory word in the switch memory KM, information is read from the previous time slot into a position in the buffer memory being at the same time indicated by the address calculating unit AD2 which executes a simple conversion of the address information obtained from memory KM into a time slot address. The writing into the buffer memory is made in consecutive time slots belonging to the same data channel.

Figure 3:
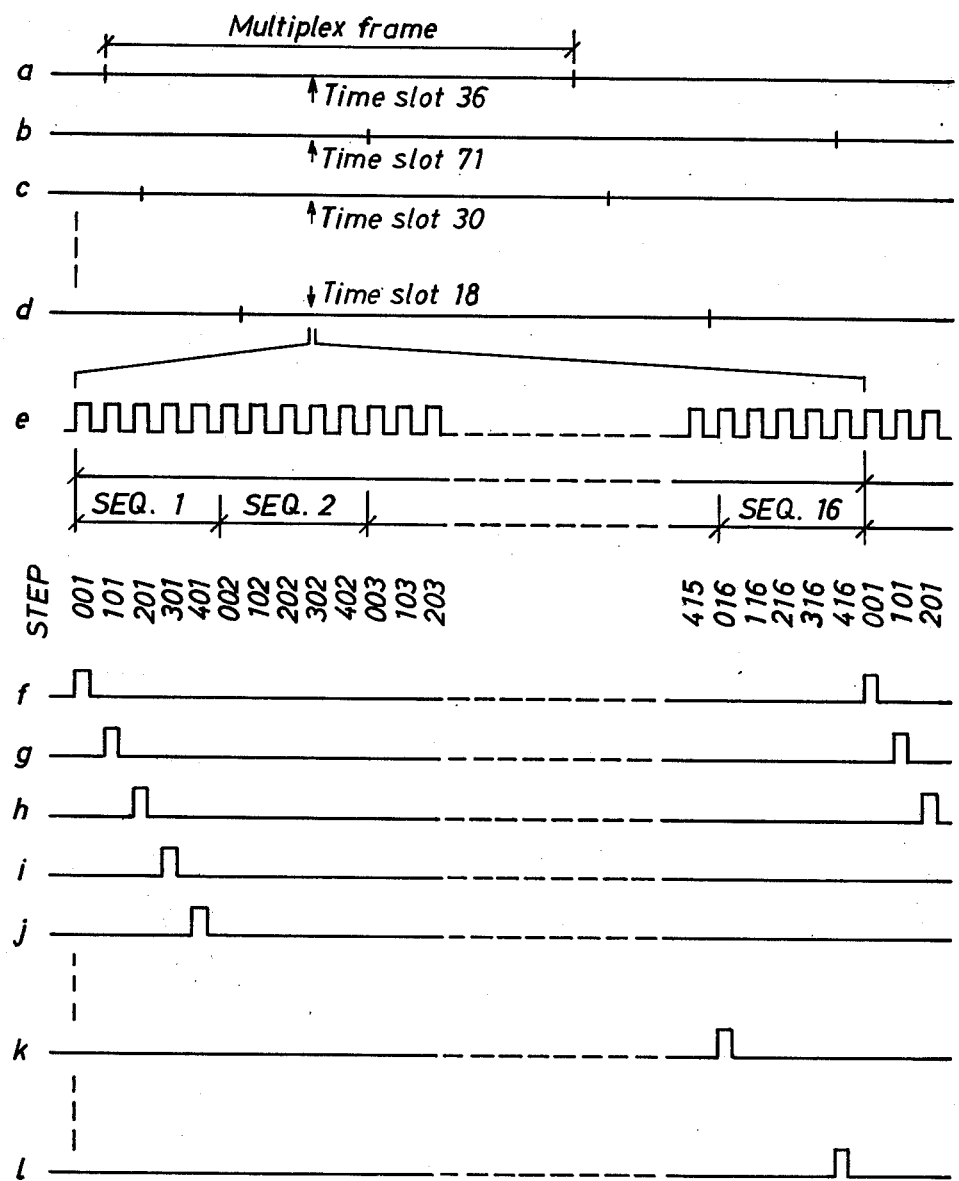
FIG. 3 is a timing diagram which shows the principle for scanning of the multiplex connections.

The addressing procedure is illustrated in the timing diagram, FIG. 3, where the relative timing conditions for 4 different TDM connections are shown on the lines a, b, c and d, each comprising 80 time slots per multiplex frame. Within the duration of a time slot (according to the example the time slots 36, 71, 30 and 18 respectively for the frames shown), all the multiplexes are scanned in a cycle comprising, according to the example, 64 steps in accordance with the timing pulses on line e. As previously described, the cycle comprises 16 sequences, each having five steps. The five steps relating to sequence number 1 of the cycle are shown on the lines f – j. During step 001, according to line f, the above information transfer from the buffer memory BM to the reading buffers UB1 – UB4 is made for the outgoing multiplex connections MF 101, 201, 301 and 401. During the following step (101) a time slot is read in from the incoming multiplex connection MF 101 and the corresponding time slot is read-out to the outgoing multiplex connection MF 101 in synchronism with new write-in operations in the switch memory and the buffer memory. During the next step (201) the multiplex connection MF 201 is treated in the corresponding way and so on until the cycle is completed by the treatment of the multiplex connection MF 416.

The switch memory KM, as shown in FIG. 4, has a memory area for each of the 64 multiplex connections MF 101 – 416. In each area there is a memory word for each of the data channels in the respective multiplex connections, the number of channels depending on the allocation of the time slots to different rates. The greatest number of channels (80) is obtained if all the channels have the data rate 75 characters per second. The other extreme case is that all of the time slots in a multiplex connection, for example connection MF 415, are utilized for one data channel only with the rate 6000 characters per second. Between these extreme cases there are multiplexes with a varying number of channels of different rates within the range 75 - 1200 characters per second. Thus, according to the figure connection MF 101 has five data channels K1 - K5, all with the data rate 1200 ch/s, while for example connection MF 416 has 10 data channels, of which two are for 1200 ch/s and the other are equally divided between 300 and 600 ch/s. The writing of information into the respective memory words occurs at a repetition rate determined by the data rate of the data channels and in accordance with the address information obtained from the address calculating unit AD1. As previously mentioned, an analysis of the incoming information occurs in connection with the setting-up phase, whereby the address to the outgoing direction is determined. This address is stored in the word segment marked ADDR in FIG. 4. In the word segment CLASS the data rate of the channel is indicated and in the word segment DATA the data signals are written which are to be transferred to the buffer memory. Other word segments are intended for various purposes as status information, signal analysis, time measurement and so on.

Figure 5:
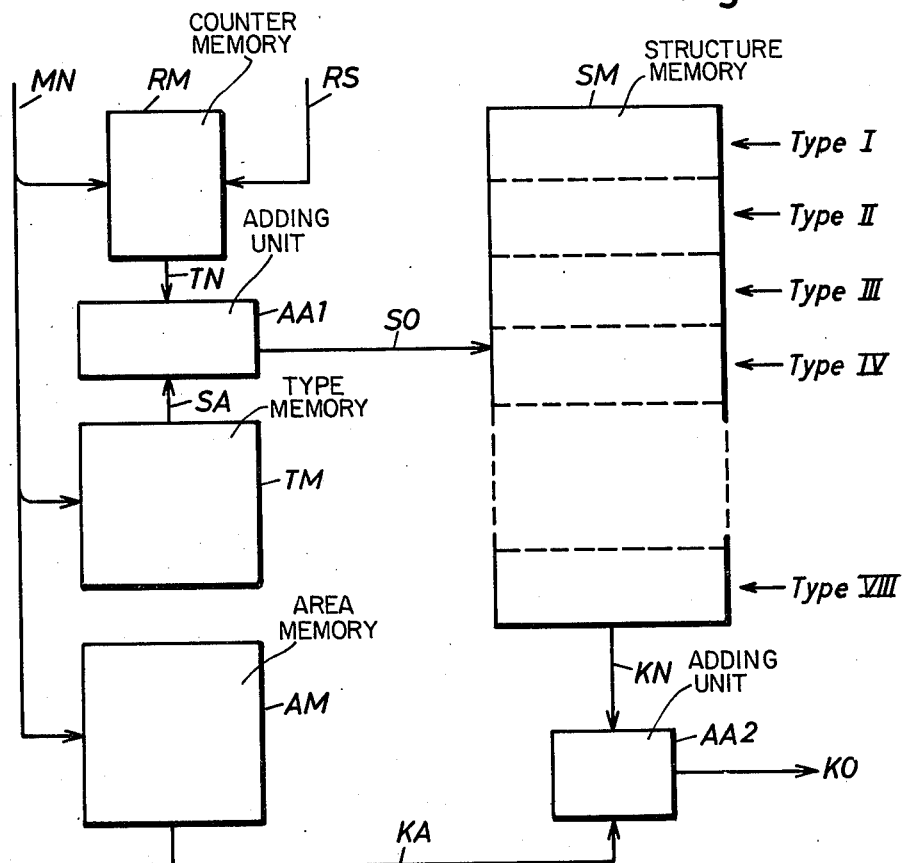
FIG. 5 is a block diagram of an addressing apparatus according to the invention.

In FIG. 5 an example is shown of how the address calculating unit AD1 can be constructed. The apparatus comprises a structure memory SM which has a number of memory areas e.g. eight, each of which describes the structure of a multiplex frame, i.e. how the 80 time slots are divided between data channels with different rates. In this way each of the different areas corresponds to one type of multiplex structure, which appears more in detail from FIG. 6 wherein an example is shown of how two types of multiplex structures can be constituted. Type I may be applied to the multiplex connection MF 101 which, according to FIG. 4, only includes five channels for 1200 ch/s. Type II may be applied to connection MF 416 which includes 10 channels for the rates 300, 600 and 1200 ch/s. The structures may be modified in accordance with the traffic demands and the allocation of the structures to the various multiplex connections may also be changed in accordance with the channel requirements on the connection. The apparatus further comprises a type memory TM which, by means of the multiplex connection identity received on the address bus MN, indicates the relevant type area in the structure memory, e.g. the type I for connection MF 101. By means of a counter memory RM, which on the one hand receives the above mentioned identity information on the bus MN and, on the other hand, receives the synchronization information on the path RS, information is obtained about the sequence number of the time slot which is read into the read-in buffer IB. According to the embodiment, the synchronization information is transferred together with the data signals in the form of marking bits, with the aid of which the first time slot in each multiplex frame may be identified, and it is used to zero-set a memory word in the counter memory belonging to the respective multiplex connection. Each time this memory word is addressed from the address bus, the word is incremented by 1. The time slot number, e.g. eight, is read-out on the path TN and in the adding unit AA1 it is added to the address of the type area from the path SA. The result address on the path SO thus points out the time slot 8 in the type I area which, according to FIG. 6, indicates channel 3. The address calculating unit further comprises a memory, namely an area memory AM which too is addressed with the identity of the multiplex connection. On path KA from this memory one obtains the start address to the memory area in the switch memory KM which belongs to the multiplex connection in question and in the adding arrangement AA2 this start address is added to the channel number which is obtained from the structure memory SM on the path KN. The result address on path KO then singles out the word in the switch memory in which the information from the data bus DB is to be written.

I claim:

1. A method of economically addressing memory positions in a switch memory of a transit exchange for the transfer of synchronous data signals in incoming data channels received by incoming TDM-links to outgoing data channels transmitted on outgoing TDM-links which transfer data having several data rates that are multiples of a basic rate derived from the number of time slots in a TDM frame, the transit exchange including a switch memory for storage of incoming data signals in memory positions, each of which is assigned to one of the incoming data channels in the incoming TDM-links, and a buffer memory to which the data signals are transferred from said switch memory and stored in memory positions assigned to the time slots belonging to the respective outgoing data channels on the outgoing TDM-links before they are sent via these links, the writing as well as the reading occurring at a repetition rate determined by the data rate of the respective channels, said method comprising the steps of identifying the incoming TDM-link, deriving from the identification of the incoming TDM-link a data rate-type designation, the type designation being common to several links, deriving structure information in correspondence with said type designation, the structure information indicating the allocation of time slots to the various data channels of the respective link, and storing the incoming data signals in said memory positions of said switch memory in accordance with said structure information.

2. In a transit exchange for the transfer of synchronous data signals received from incoming data channels on incoming TDM-links to outgoing data channels on outgoing TDM-links, the transit exchange including a switch memory with addressable memory positions for the storage of incoming data signals, each of which is assigned to one of the incoming data channels in the incoming TDM-links, and a buffer memory having memory positions to which the data signals are thereafter transferred from said switch and stored, the memory positions of the buffer memory being assigned to the time slots of the respective outgoing channels in the outgoing TDM-links, before they are sent via the outgoing TDM-links, the writing as well as the reading occurring at a repetition rate determined by the data rate of the respective channels, apparatus for addressing memory positions in the switch memory comprising: means for identifying an incoming TDM-link; means designating a link type based on data-rates of the link, the type designation being common to several links, said type designating means including a type memory arranged to supply a type designation in accordance with the designated link type; and means for generating structure information derived from the type designation, the structure information indicating the allocation of time slots to the various data channels of the respective link, said means including a structure memory having a memory area for each link type designation arranged to provide addresses of memory positions of the switch memory which are to receive the data signals.

* * * * *